United States Patent
Brown et al.

(10) Patent No.: US 9,958,583 B1
(45) Date of Patent: May 1, 2018

(54) GREEN LASER LINE NOTCH ABSORBER

(71) Applicants: Robert G. Brown, Tustin, CA (US); Steven E. Koenck, Cedar Rapids, IA (US); James E. Melzer, Encinitas, CA (US); Wyatt L. Hendrick, San Diego, CA (US)

(72) Inventors: Robert G. Brown, Tustin, CA (US); Steven E. Koenck, Cedar Rapids, IA (US); James E. Melzer, Encinitas, CA (US); Wyatt L. Hendrick, San Diego, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 16 days.

(21) Appl. No.: 14/278,965

(22) Filed: May 15, 2014

(51) Int. Cl.
*G02B 5/22* (2006.01)
*G02B 5/20* (2006.01)
*B82Y 20/00* (2011.01)

(52) U.S. Cl.
CPC ........... *G02B 5/206* (2013.01); *G02B 5/22* (2013.01); *B82Y 20/00* (2013.01); *Y10S 977/773* (2013.01); *Y10S 977/834* (2013.01)

(58) Field of Classification Search
CPC ...... G02B 26/008; G02B 7/006; G02B 5/201; G02B 5/22; G02B 7/008; G02B 5/003; G02B 5/20; G02B 5/223; G02B 26/007; G02B 5/206; G03B 11/00; G03B 17/12; B82Y 20/00; Y10S 977/834; Y10S 977/773
USPC ....................................................... 359/892
See application file for complete search history.

(56) References Cited

U.S. PATENT DOCUMENTS

| 5,422,684 | A | * | 6/1995 | Keller | 351/41 |
| 2007/0298242 | A1 | * | 12/2007 | Huo | 428/323 |
| 2010/0225834 | A1 | * | 9/2010 | Li | G02C 7/08 349/13 |
| 2010/0283957 | A1 | * | 11/2010 | Matera | B29D 11/00634 351/49 |
| 2012/0171438 | A1 | * | 7/2012 | Roberts, III | B82Y 30/00 428/206 |
| 2014/0233105 | A1 | * | 8/2014 | Schmeder et al. | 359/590 |

FOREIGN PATENT DOCUMENTS

WO WO 2012177296 A1 * 12/2012

OTHER PUBLICATIONS

Holographic Notch Filter. Science Madness., 2001. Web. Aug. 12, 2015. <www.sciencemadness.org>.*

(Continued)

*Primary Examiner* — Bumsuk Won
*Assistant Examiner* — Henry Duong
(74) *Attorney, Agent, or Firm* — Donna P. Suchy; Daniel M. Barbieri

(57) ABSTRACT

An optical notch filter includes a particle layer including nano-particles in a substrate material. The nano-particles are arranged in one or more arrays to provide a nano plasmonic absorption of radiation having a wavelength of 532 nm incident on the filter. The filter exhibits a radiation absorption profile with an absorption maxima of at least 99% at 532 nm for an angle of incidence of between +50° and −50°, and has a full width half maxima transmission of less than 15 nm.

14 Claims, 3 Drawing Sheets

(56) References Cited

OTHER PUBLICATIONS

Ueno, K., S. Juodkazis, V. Mizeikis, K. Sasaki, and H. Misawa. "Clusters of Closely Spaced Gold Nanoparticles as a Source of Two-Photon Photoluminescence at Visible Wavelengths." Adv. Mater. Advanced Materials 20.1 (2008): 26-30. Web.*

Cullen et al., Detection of immune-complex formation via surface plasmon resonance on gold-coated diffraction grating, Biosensors, vol. 3, Iss. 4, pp. 211-225 (1987-1988).

Hedayati et al., Plasmonic tunable metamaterial absorber as ultraviolet protection film, Applied Physics Letters vol. 104, p. 041103 (2014).

* cited by examiner

GREEN LASER LINE NOTCH ABSORBER

FIELD OF INVENTION

The present invention relates to an optical notch filter for filtering green light at 532 nm using nano-particles arranged in one or more arrays to provide a nano plasmonic absorption of radiation having a wavelength of 532 nm.

BACKGROUND

Nano-particles are widely used for their optical properties. In their use, nanoparticles are known to be excellent scatterers of light and other electromagnetic radiation (EMR).

Nano-particles embedded in a substrate may exhibit a plasmonic effect where the nano-particle may support surface plasmons or localized plasmons. Both of these effects may provide plasmonic absorption of light at a particle wavelength. For example, total plasmonic absorption by localized plasmons of ultra-violet (UV) light has been demonstrated [Plasmonic tunable metamaterial absorber as ultraviolet protection film, M. K. Hedayati et al., Applied Physics Letters vol. 104, page 041103 (2014)]. Total plasmonic absorption by surface plasmons of red HeNe laser light has also been demonstrated [Detection of immune-complex formation via surface plasmon resonance on gold-coated diffraction grating, D. C. Cullen et al., Biosensors, Vol. 3, Iss. 4, pp. 211-225 (1987-1988)].

Lasers, such as held lasers, represent a serious threat to pilots, soldiers, first responders, etc, when the laser is directed to the eyes. The result of such eye exposure may result in an effect from startling, to temporary blindness, and even eye damage. In particular, hand held lasers emitting green laser light at a wavelength of 532 nm are known to be used to impair pilots and soldiers.

Filters are known for blocking light at 532 nm. Such filters, however, may not provide a filter which is largely insensitive to the angle of incidence of light impinging on the filter, and at the same time provide good transmission outside of light wavelength range near 532 nm. For example, thin film quarter wave stacks, rugates and angularly sensitive, and further affect a user's color spectrum. While dye-based systems are inexpensive and not angularly insensitive, they exhibit poor transmission outside of light wavelength range near 532 nm, and further as susceptible to solar degradation.

SUMMARY

According to one embodiment, there is provided an optical notch filter, comprising: a particle layer including nano-particles in a substrate material, wherein the nano-particles are arranged in one or more arrays to provide a nano plasmonic absorption of radiation having a wavelength of 532 nm incident on the filter, the filter exhibiting a radiation absorption profile with an absorption maxima of at least 99% at 532 nm for an angle of incidence of between +50° and −50°, and having a full width half maxima transmission of less than 15 nm.

According to one aspect of the embodiment, the nano-particles are formed of an Al material.

According to another aspect of the embodiment, the substrate material is formed of an insulating material.

According to another aspect of the embodiment, the substrate material is formed of at least one of a glass material and a polymer material.

According to another aspect of the embodiment, the filter exhibits a radiation absorption profile with an absorption maxima of at least 99% at 532 nm for an angle of incidence of between +60° and −60°.

According to another aspect of the embodiment, the filter exhibits a radiation absorption profile with an absorption maxima of at least 99.9% at 532 nm for an angle of incidence of between +50° and −50°.

According to another aspect of the embodiment, the nano-particles are arranged in lines.

According to another aspect of the embodiment, the nano-particles are arranged in a checkerboard pattern.

According to another aspect of the embodiment, the nano-particles are cylindrical, spherical, cubic, rectangular-cubic, ellipsoidal, planar or spiral-twisted.

According to another aspect of the embodiment, the filter is radiation polarization insensitive.

According to another aspect of the embodiment, the filter is radiation polarization sensitive.

According to another aspect of the embodiment, the nano-particles are oriented in a same direction.

According to another aspect of the embodiment, the particle layer comprises a plurality of sublayers, each sublayer including nano-particles arranged in an array in the substrate material.

According to another aspect of the embodiment, the number of sublayers is in the range of 5 to 25.

According to another aspect of the embodiment, the number of sublayers is in the range of 10 to 15.

According to another aspect of the embodiment, the filter exhibits a radiation absorption profile having a full width half maxima transmission of less than 10 nm.

According to another aspect of the embodiment, wherein the filter exhibits a radiation absorption profile having a full width half maxima transmission of less than 2 nm.

According to another aspect of the embodiment, an optical system comprises the optical notch filter and a support holding the optical notch filter.

According to another aspect of the embodiment, the optical system is a protective visor.

According to another embodiment, there is provided an optical notch filter, comprising a particle layer including nano-particles in a substrate material, wherein the nano-particles are arranged in one or more arrays to provide a nano plasmonic absorption of radiation having a wavelength in the visible region incident on the filter, the filter exhibiting a radiation absorption profile with an absorption maxima of at least 99% at a wavelength in the visible region for an angle of incidence of between +50° and −50°, and having a full width half maxima transmission of less than 15 nm.

DETAILED DESCRIPTION

Described below is a narrow band notch filter that substantially blocks green light at 532 nm, where the notch filter has a layer of nano-particles that absorb the green light based on plasmonic absorption. The notch filter is insensitive to the angle of incidence of incident radiation over a wide range of incidence angles.

Figure 1:
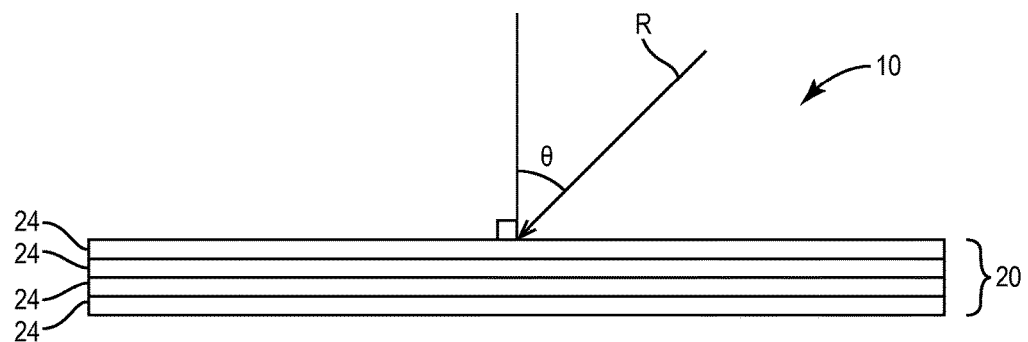
FIG. 1 is a schematic of a side view of a notch filter blocking light at 532 nm according to an embodiment of the invention.
Figure 2:
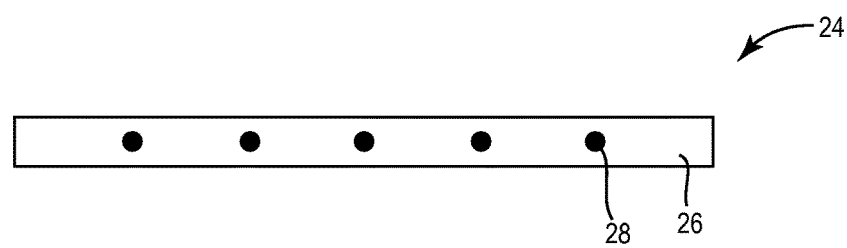
FIG. 2 is a schematic of a side view of a sublayer of the notch filter of FIG. 1.

FIG. 1 is a side schematic view of a notch filter 10 according to one embodiment. The notch filter 10 includes a particle layer 20 including one or more sublayers 24. Each sublayer 24, as shown in FIG. 2, includes nano-particles 28 arranged in a substrate material 26. The nano-particles 28 may be arranged in one or more arrays to provide a nano plasmonic absorption of radiation having a wavelength of 532 nm incident on the filter 10. FIG. 1 illustrates radiation R incident on the filter with an angle of incidence of θ. The notch filter 10 exhibits a radiation absorption profile with an absorption maxima of at least 99% at 532 nm for an angle of incidence θ of between +50° and −50°, and having a full width half maxima transmission of less than 15 nm. Alternatively, the absorption maxima may be somewhere in the visible region of light other than at 532 nm wavelength.

Figure 3:
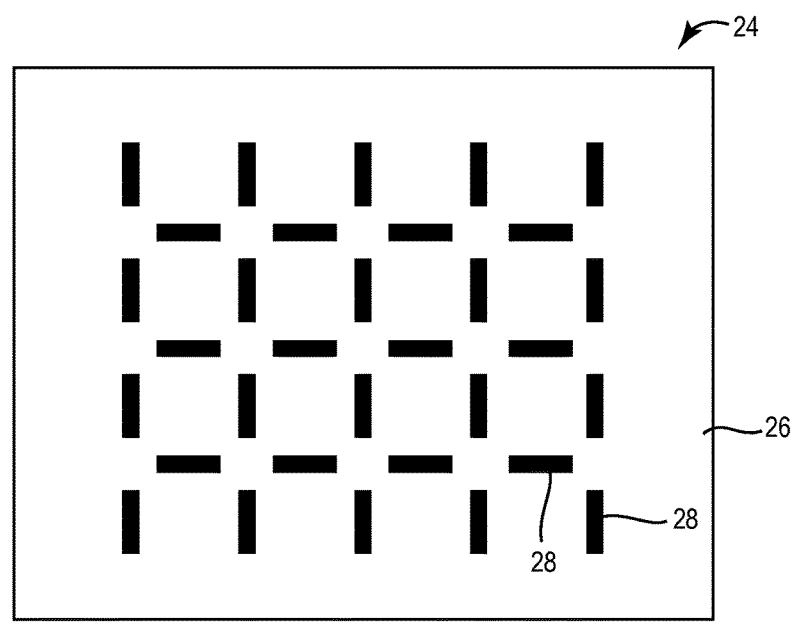
FIG. 3 is a schematic of a top view of the sublayer of FIG. 2.

FIG. 3 is a top view of the sublayer 24 of FIG. 2. As can be seen in FIG. 3, the nano-particles 28 are embedded within the substrate material 26 so as to form an array of nano-particles 28. FIG. 3 illustrates the nano-particles 28 to be arranged in lines, and specifically in a checkerboard pattern with both vertical and horizontal lines of nano-particles 28. The arrangement of nano-particles 28 may be other than a checkboard pattern, and may be all oriented in a same direction, for example.

As can be surmised from FIGS. 2 and 3, the nano-particles 28 may be cylinders. Alternatively, the nano-particles may have any shape as appropriate, and may be, for example, cylindrical, spherical, cubic, rectangular-cubic, ellipsoidal, planar or spiral-twisted.

The nano-particles 28 are formed of a material providing a good absorption at a wavelength of 532 nm, while at the same time providing good transmission at wavelengths near 532 nm. The nano-particles 28 may be formed of Al, for example, or of some other material.

The nano-particles 28 may be formed of an appropriate shape. For example, the nano-particles may be cylindrical, spherical, cubic, rectangular-cubic, ellipsoidal, planar or spiral-twisted.

The nano-particles 28 should have a shape, size and spacing between nano-particles to provide an appropriate radiation absorption profile. For example, the nano-particles 28 should have a shape, size and spacing between nano-particles to provide a radiation absorption profile with an absorption maxima of at least 99% at 532 nm for an angle of incidence θ of between +50° and −50°, and having a full width half maxima transmission of less than 15 nm.

The substrate material 26 is formed of a material which alone, i.e., without the nano-particles 28, provides a good transmission at wavelengths around 532 nm. The substrate material 26, may be, for example, an insulating material. The substrate material 26 may be a glass material or a polymer material, for example.

Figure 4A:
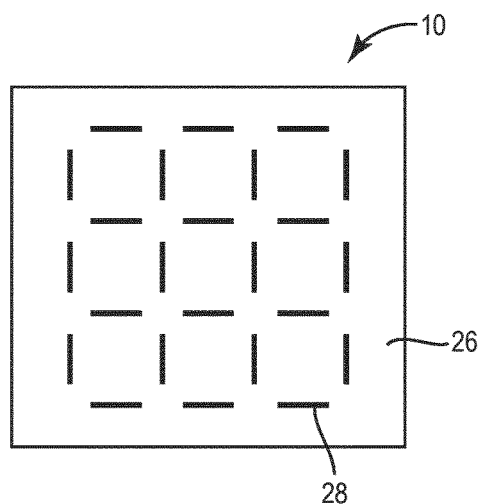
FIG. 4A is a schematic of a top view of a notch filter blocking light at 532 nm which is polarization insensitive according to an embodiment of the invention.
Figure 4B:
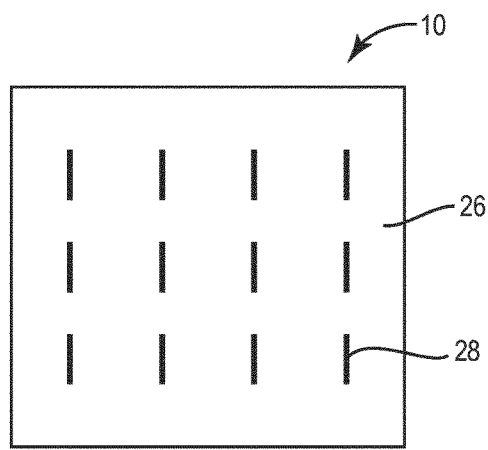
FIG. 4B is a schematic of a top view of a notch filter blocking light at 532 nm which is polarization sensitive according to an embodiment of the invention.

The optical notch filter 10 may be radiation polarization sensitive or insensitive, depending on the desired application. For example, FIGS. 4A and 4B are top schematic views of an optical notch filter 10, which are polarization insensitive and sensitive, respectively. In the polarization insensitive arrangement of FIG. 4A, the nano-particles 28 are arranged in the substrate material 26 in the checkboard pattern of FIG. 3, where the two orthogonal lines (vertical and horizontal) of nano-particles 28 provide polarization insensitivity. In the polarization sensitive arrangement of FIG. 4B, the nano-particles 28 are arranged in the substrate material 26 oriented in lines along a same direction, where the same direction of the lines provides polarization sensitivity.

Returning to FIG. 1, the number of sublayers 24 will depend on the desired radiation absorption profile, that is the absorption as a function of radiation wavelength around 532 nm. In general, an increase in the number of sublayers 24 will result in a narrower absorption profile, with a narrower full width half maxima for the transmission. On the other hand, an increase in the number of sublayers 24 may decrease the overall transmission of the filter in visible wavelengths outside of the absorption band, and may increase the cost of manufacture of the notch filter 10.

The number of sublayers 24 may be in the range 5 to 25, for example. Alternatively, the number of sublayers 24 may be in the range 10-15, for example. The invention is not limited to a particular number of sublayers 24.

Regarding the radiation absorption profile, the filter may exhibit a radiation absorption profile with an absorption maxima of at least 99% at 532 nm for an angle of incidence of between +60° and −60°. The filter may exhibit a radiation absorption profile with an absorption maxima of at least 99.9% at 532 nm for an angle of incidence of between +50° and −50°. The filter may exhibit a radiation absorption profile having a full width half maxima transmission of less than 10 nm. The filter may exhibit a radiation absorption profile having a full width half maxima transmission of less than 2 nm.

Figure 6:
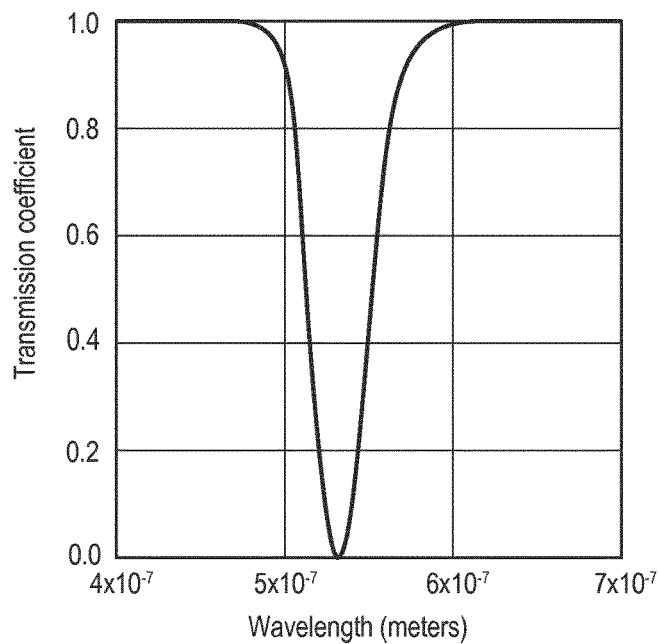
FIG. 6 is a graph illustrating an absorption profile of a notch filter, according to an embodiment of the invention.

FIG. 6 is a graph illustrating an absorption profile, a calculated transmission coefficient of a green 532 nm notch filter with ten sublayers having Al nano-particles. For FIG. 6, each sublayer has nano-particles laid out in the grid pattern as set out in FIG. 4A, with each nano-particle having a length of about 13 nm and a cross section of about 10 nm, with a spacing between nano-particles of 110 nm. Absorption in excess of 99.9% can be obtained at the laser wavelength of 532 nm. This performance varies negligibly over a range of angle of-incidence of +1−~50-degrees, and for any arbitrary incident polarization. While FIG. 6 illustrates the an absorption profile for ten sublayers, narrower spectral responses may be obtained by adding more sublayers of nano-particle arrays. Further, the nano-particle length, cross section, and spacing may be further optimized to provide a desired absorption profile.

Figure 5A:
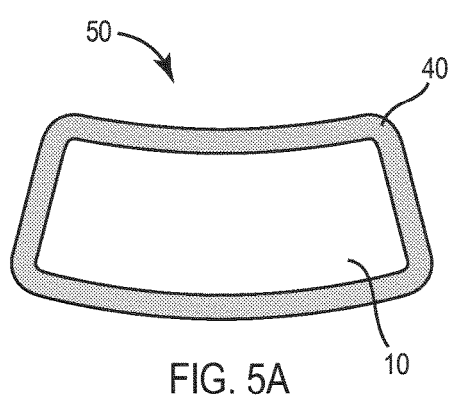
FIG. 5A illustrates an optical system including a notch filter blocking light at 532 nm and a support, where the optical system is a protective visor, according to an embodiment of the invention.

FIG. 5A illustrates an optical system 50 incorporating the notch filter 10 according to an embodiment of the invention. The optical system 50 in FIG. 5A is a protective visor including a support 40 holding the notch filter 10.

Figure 5B:
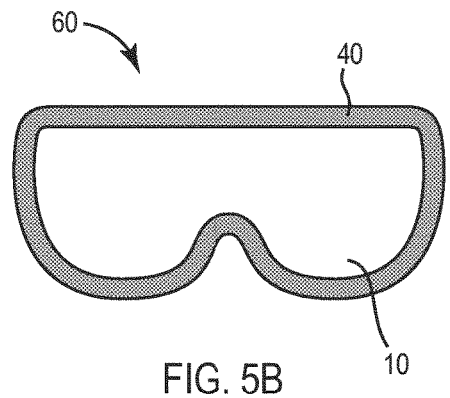
FIG. 5B illustrates an optical system including a notch filter blocking light at 532 nm and a support, where the optical system is a protective visor, according to an embodiment of the invention.

FIG. 5B illustrates another optical system 60 incorporating the notch filter 10 according to an embodiment of the invention. The optical system 60 in FIG. 5B is protective eyewear including a support 40 holding the notch filter 10.

Advantages

The above described notch filter may provide significant protection against the green laser line at 532 nm from lasers, such as hand held lasers. The notch filter arranged to protect the eyes of pilots, soldiers, first responders, etc, can prevent the damaging effects of the laser light to the eyes. Moreover, because the filter is notch filter with a relatively narrow absorption band around 532 nm, the filter does not impair a user from seeing light over a large portion of the visible spectrum.

Figure 7:
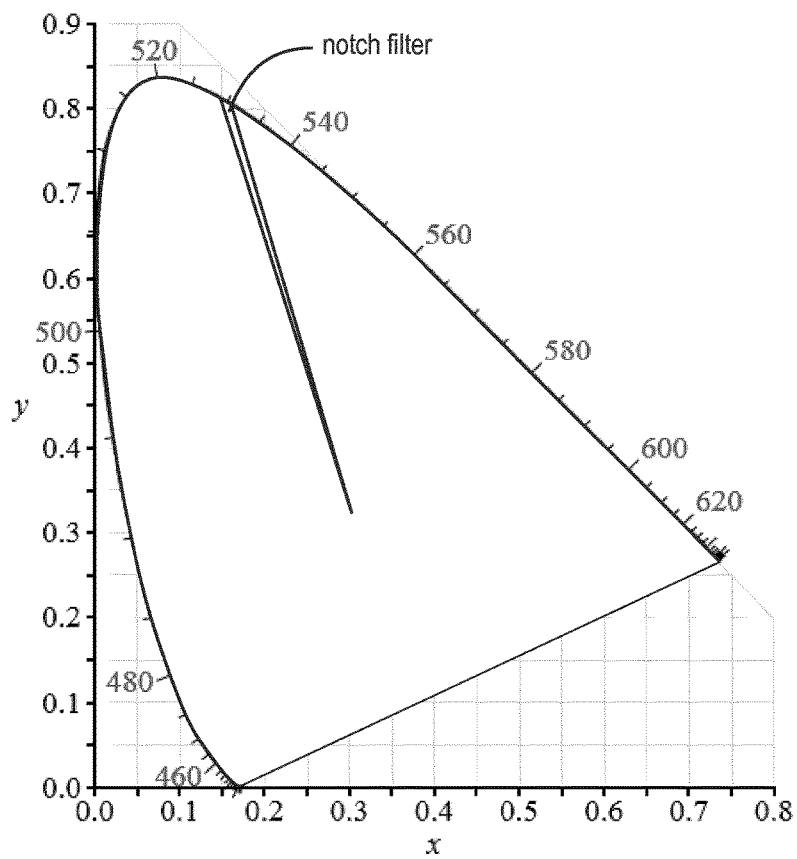
FIG. 7 is graph illustrating a CIE x,y Color Chart.

The above described notch filter further provides eye protection over a relatively large incidence angle range. Thus, eye protection is provided over a large incident angle range centered around normal incidence allowing the user enhanced protection. A further advantage of the above described notch filter is that the notch filter exhibits low CIE color distortion. Thus, a user of the notch filter will be able to see a desired scene without color distortion. FIG. 7 illustrates a CIE x,y Color Chart with light wavelengths in nm noted around the edge, with a green notch filter "slice" overlaid. FIG. 7 illustrates how small a slice of the color "pie" is removed from the full color spectrum (the full Color Chart) that the eye can see. The amount of color distortion due to the notch amounts to only a few "Just Noticeable Differences" (JND). Professionally trained human vision can detect changes of perhaps 3 JNDs at best, and most people cannot see changes of a few times more than this. Thus, the perceptible distortion of perceived color by using the green notch filter is very small.

Still further, the above described notch filter provides good 532 nm light blocking with a relatively smaller number of sublayers than quarter wave stack filters, which may require 50 or more layers. Such a reduced number of sublayers reduces the cost of production.

The embodiments of the invention have been described in detail with particular reference to preferred embodiments thereof, but it will be understood by those skilled in the art that variations and modifications can be effected within the spirit and scope of the invention.

What is claimed is:

1. An optical notch filter, comprising:
   a particle layer including nano-particles in a substrate material,
   wherein the nano-particles are arranged in one or more arrays having a checkerboard grid pattern and having a fixed spacing between the nano-particles to provide a nano plasmonic absorption of radiation having a wavelength of 532 nm incident on the filter, the checkerboard grid pattern comprising a first group of nano-particles extending along a vertical direction and arranged in vertical lines and a second group of nano-particles extending along a horizontal direction and arranged in horizontal lines, the filter exhibiting a radiation absorption profile with an absorption maxima of at least 99% at 532 nm for an angle of incidence of between +50° and −50°, and having a full width half maxima transmission of less than 15 nm.

2. The optical notch filter of claim 1, wherein the nano-particles are formed of an Al material.

3. The optical notch filter of claim 1, wherein the substrate material is formed of an insulating material.

4. The optical notch filter of claim 3, wherein the substrate material is formed of at least one of a glass material and a polymer material.

5. The optical notch filter of claim 1, wherein the filter exhibits the radiation absorption profile with the absorption maxima of at least 99.9% at 532 nm for the angle of incidence of between +50° and −50°.

6. The optical notch filter of claim 1, wherein the filter is insensitive to a polarization of radiation incident on the filter.

7. The optical notch filter of claim 1, wherein the particle layer comprises a plurality of sublayers, each sublayer including nano-particles arranged in an array in the substrate material.

8. The optical notch filter of claim 7, wherein a number of sublayers is in a range of 5 to 25.

9. The optical notch filter of claim 8, wherein the number of sublayers is in a range of 10 to 15.

10. An optical system comprising:
    the optical notch filter of claim 1; and
    a support holding the optical notch filter.

11. The optical system of claim 10, wherein the optical system is a protective visor or protective eyewear.

12. The optical notch filter of claim 1, wherein the one or more arrays is a single array.

13. An optical notch filter, comprising:
    a particle layer including nano-particles in a substrate material,
    wherein the nano-particles are arranged in one or more arrays having a checkerboard grid pattern and having a fixed spacing between the nano-particles to provide a nano plasmonic absorption of radiation having a wavelength of 532 nm incident on the filter, the checkerboard grid pattern comprising a first group of nano-particles extending along a vertical direction and arranged in vertical lines and a second group of nano-particles extending along a horizontal direction and arranged in horizontal lines,
    wherein the filter exhibits a radiation absorption profile with an absorption maxima of at least 99% at 532 nm for an angle of incidence of between +60° and −60°, and has a full width half maxima transmission of less than 15 nm.

14. An optical notch filter, comprising:
    a particle layer including nano-particles in a substrate material,
    wherein the nano-particles are arranged in one or more arrays having a checkerboard grid pattern and having a fixed spacing between the nano-particles to provide a nano plasmonic absorption of radiation having a wavelength in a visible region incident on the filter, the checkerboard grid pattern comprising a first group of nano-particles extending along a vertical direction and arranged in vertical lines and a second group of nano-particles extending along a horizontal direction and arranged in horizontal lines, the filter exhibiting a radiation absorption profile with an absorption maxima of at least 99% at a wavelength in the visible region for an angle of incidence of between +50° and −50°, and having a full width half maxima transmission of less than 15 nm.

* * * * *